US012564186B1

(12) United States Patent
Richards

(10) Patent No.: US 12,564,186 B1
(45) Date of Patent: Mar. 3, 2026

(54) CLIMBING AID

(71) Applicant: John Richards, Bruce Township, MI (US)

(72) Inventor: John Richards, Bruce Township, MI (US)

( * ) Notice: Subject to any disclaimer, the term of this patent is extended or adjusted under 35 U.S.C. 154(b) by 1039 days.

(21) Appl. No.: 17/591,562

(22) Filed: Feb. 2, 2022

Related U.S. Application Data

(60) Provisional application No. 63/144,965, filed on Feb. 2, 2021.

(51) Int. Cl.
A01M 31/02 (2006.01)
E06C 1/52 (2006.01)

(52) U.S. Cl.
CPC .................................... A01M 31/02 (2013.01)

(58) Field of Classification Search
CPC .. A01M 31/02; E06C 9/14; E06C 1/56; E06C 1/381; E06C 1/52; E06C 1/525; A63B 27/00
See application file for complete search history.

(56) References Cited

U.S. PATENT DOCUMENTS

| | | | | |
|---|---|---|---|---|
| 1,097,522 A | * | 5/1914 | Brown ...................... | E06C 1/56 182/228.1 |
| 1,725,367 A | * | 8/1929 | Mowry ..................... | E06C 1/56 182/198 |
| 3,961,686 A | * | 6/1976 | Starkey ................. | A01M 31/02 182/187 |
| 4,139,079 A | * | 2/1979 | Clark ..................... | B63B 29/205 182/189 |
| 7,051,497 B2 | * | 5/2006 | Peterson ................... | E06C 1/56 54/44.1 |
| 8,701,829 B1 | * | 4/2014 | Wyne ........................ | E06C 1/56 182/136 |
| 12,208,312 B2 | * | 1/2025 | D'Acquisto ........... | A63B 27/00 |
| 2003/0183452 A1 | * | 10/2003 | Montecer, Jr. ........ | B63B 27/146 182/93 |
| 2004/0031646 A1 | * | 2/2004 | Huang .................... | E06C 1/525 182/198 |
| 2005/0284700 A1 | * | 12/2005 | Sylvia .................... | A63B 27/00 182/136 |
| 2015/0337597 A1 | * | 11/2015 | Arnette ..................... | E06C 1/34 182/195 |

* cited by examiner

*Primary Examiner* — David E Martinez
(74) *Attorney, Agent, or Firm* — Barry Choobin; PATENT 360

(57) ABSTRACT

A climbing aid for climbing to an elevated vantage point while hunting. The climbing aid includes multiple units that can be fastened and unfastened from each other, wherein each unit forms a step of the climbing aid. Each unit includes a webbing of a tubular and an elongated geometry. The webbing has a proximal end and a distal end. A hollow tube slidably positioned at about the middle of the webbing, the tube has a proximal end and a distal end. A right link is positioned adjacent to the proximal end of the hollow tube. A left link is positioned adjacent to the distal end of the hollow tube. A right webbing slider is positioned between the right link and the proximal end of the webbing. A left webbing slider is positioned between the left link and the distal end of the webbing.

10 Claims, 1 Drawing Sheet

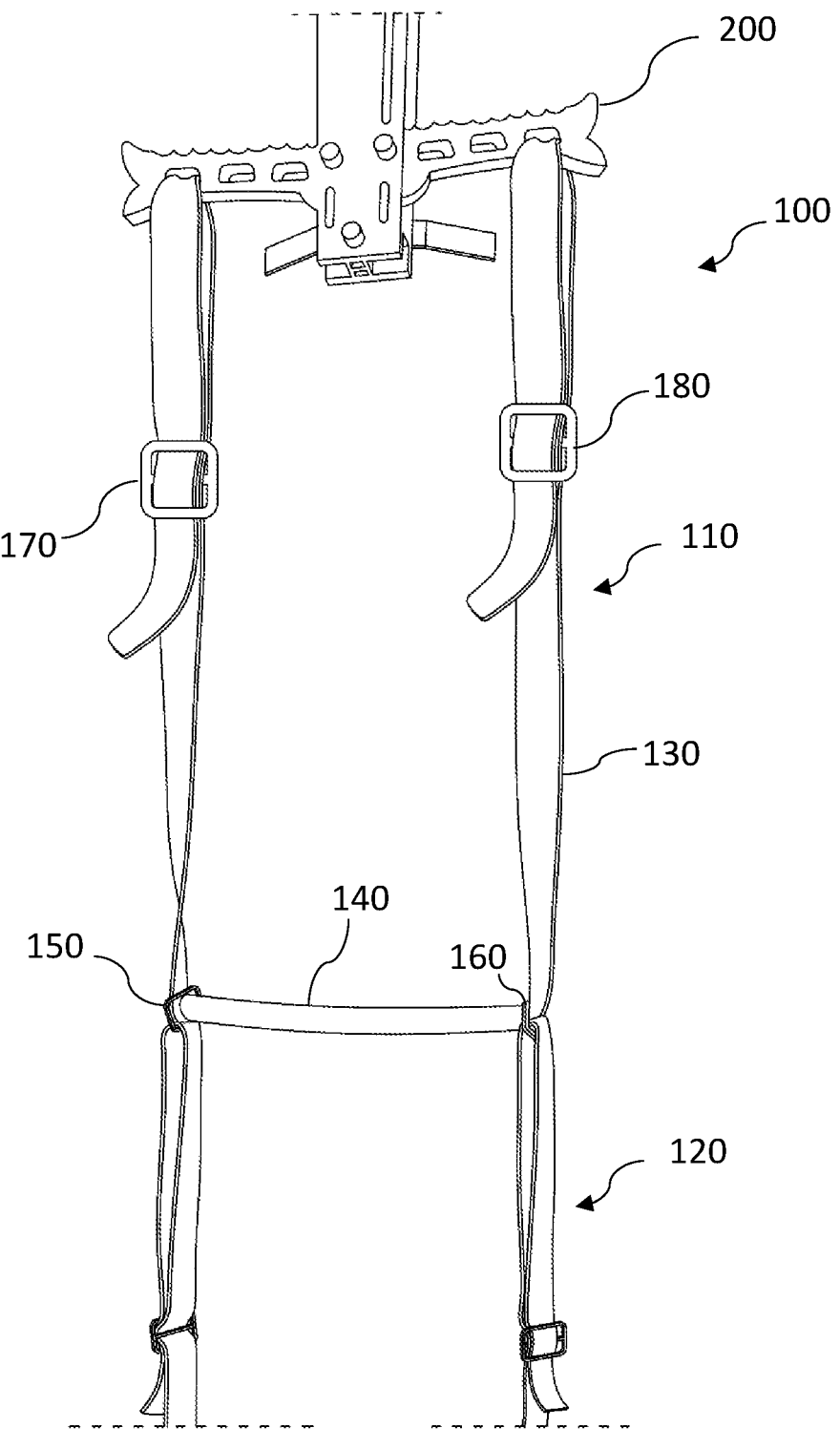

CLIMBING AID

CROSS-REFERENCE TO RELATED APPLICATIONS

This application claims priority from the U.S. provisional patent application Ser. No. 63/144,965, filed on Feb. 2, 2021, which is incorporated herein by reference in its entirety.

FIELD OF INVENTION

The present invention relates to a climbing aid, and more particularly, the present invention relates to a climbing aid for use by hunters in saddle hunting.

BACKGROUND

Saddle hunting is a popular recreational activity among hunters in many parts of the world. Saddle hunting is broadly defined as hunting from an elevated vantage position. Generally, a tree stand or a saddle is mounted at an elevated point, such as on a tree. Also are known climbing sticks that allow a hunter to climb to the saddle. The climbing sticks can be similar to a ladder that provides a safe and comfortable path to the saddle at an elevated point. The climbing stick can hug to the tree through its sharp teeth and clamping system. However, the climbing sticks are bulky to carry and heavy. Generally, the more is the height of a climbing stick, the more will be the bulk and the weight. Thus, despite all the advantages of the climbing stick, the weight and the bulk of the climbing stick is a disappointment of the hunters.

Thus, a need is appreciated for a novel climbing aid that is devoid of the drawbacks or limitations of the climbing sticks and provides a safe path for the hunter to climb up.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a climbing aid for hunters that is compact and portable.

It is another object of the present invention that the climbing aid when folded has insignificant bulk.

It is still another object of the present invention that the climbing aid is economical to manufacture.

It is yet another object of the present invention that the height of the climbing aid can be adjusted.

It is still another object of the present invention that the climbing aid is light in weight.

In one aspect, disclosed is a climbing aid comprising a plurality of units, each unit of the plurality of units comprises a webbing of a tubular and an elongated geometry, the webbing has a proximal end and a distal end; a hollow tube slidably positioned at about a middle of the webbing, wherein the webbing passes through the hollow tube or the hollow tube passes through the tubular webbing, the hollow tube has a proximal end and a distal end; a right link positioned adjacent to the proximal end of the hollow tube, the right link has an aperture through which the webbing passes; a left link positioned adjacent to the distal end of the hollow tube, the left link has an aperture through which the webbing passes; a right webbing slider positioned between the right link and the proximal end of the webbing, wherein the proximal end of the webbing loops through the right webbing slider; and a left webbing slider positioned between the left link and the distal end of the webbing, wherein the distal end of the webbing loops through the left webbing slider.

In one implementation of the climbing aid, the right webbing slider and the left webbing slider are tri-glide sliders. The left link and the right link are clamped to the webbing. The hollow tube is stiff and limits the movement of the left link and the right link towards each other. The plurality of units comprises a first unit and a second unit, wherein the proximal end of the webbing of the second unit loops through the right link of the first unit and then loops through the right webbing slider of the second unit, wherein the distal end of the webbing of the second unit loops through the left link of the first unit and then loops through the left webbing slider of the second unit. The proximal end of the webbing of the first unit is configured to loop through a first aperture in a climbing stick and then loop through the right webbing slider of the first unit, wherein the distal end of the webbing of the first unit is configured to loop through a second aperture in the climbing stick and then loops through the left webbing slider of the first unit, wherein the first aperture and the second aperture of the climbing stick are spaced apart. The plurality of units further comprises a third unit, wherein the proximal end of the webbing of the third unit loops through the right link of the second unit and then loops through the right webbing slider of the third unit, wherein the distal end of the webbing of the third unit loops through the left link of the second unit and then loops through the left webbing slider of the third unit.

In one aspect, disclosed is a method for climbing up to an elevated vantage point, the method comprising the steps of providing a climbing aid, the climbing aid comprising a plurality of units, each unit of the plurality of units comprises a webbing of a tubular and an elongated geometry, the webbing has a proximal end and a distal end; a hollow tube slidably positioned at about a middle of the webbing, wherein the webbing passes through the hollow tube, the hollow tube has a proximal end and a distal end; a right link positioned adjacent to the proximal end of the hollow tube, the right link has an aperture through which the webbing passes; a left link positioned adjacent to the distal end of the hollow tube, the left link has an aperture through which the webbing passes; a right webbing slider positioned between the right link and the proximal end of the webbing, wherein the proximal end of the webbing loops through the right webbing slider; and a left webbing slider positioned between the left link and the distal end of the webbing, wherein the distal end of the webbing loops through the left webbing slider.

In one implementation of the method, the climbing aid comprises a first unit and a second unit, wherein the method comprises the step of fastening the second unit to the first unit. The method further comprises the steps of mounting the first unit to a climbing stick, wherein the climbing stick is secured to a tree. The method further comprises a step of increasing or decreasing a distance between the hollow tube of the first member and the hollow tube of the second member. The method further comprises the step of upon fastening, unfastening the second unit from the first unit.

BRIEF DESCRIPTION OF THE DRAWING

The accompanying FIGURES, which are incorporated herein, form part of the specification and illustrate embodiments of the present invention. Together with the description, the FIGURES further explain the principles of the present invention and to enable a person skilled in the relevant arts to make and use the invention.

FIG. 1 is a perspective view of the climbing aid shown hung from a climbing stick, according to an exemplary embodiment of the present invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a versatile climbing aid for ascending to an elevated point, such as a vantage elevated point in hunting. The climbing aid is light in weight and has minimal weight, thus can be easily stored, and carried by the hunter. Moreover, the disclosed climbing aid does not make noise while carrying or mounting. The disclosed climbing aid can be hung from a climbing stick already mounted to a tree. The disclosed climbing aid can be versatile by allowing to adjust a distance between two adjacent steps or adding additional steps. Thus, the disclosed versatile climbing aid can be customized by the consumers as and when desired. The steps can be added to increase the height of disclosed climbing aid. Similarly, the steps can be removed to shorten the height of the climbing aid. A single climbing aid can fit different size requirements of the hunters. Thus, disclosed is a modular climbing aid that the consumers can adjust according to their specific needs.

Referring to FIG. 1 which shows an exemplary embodiment of the disclosed climbing aid 100 shown hung from a known climbing stick 200. The climbing aid 100 can include one or more units, wherein a first unit 110, also referred to as a top unit, can be mounted to the climbing stick 200 or a similar structure. Additional units can be mounted to the first unit 110 to increase the height of the climbing aid 100. Each unit of the climbing aid constitutes one step of the climbing aid. Additional steps can be added by adding more units consecutively to a climbing aid. One or more units can be removed from a climbing aid to decrease the overall length of the climbing aid. FIG. 1 shows a second climbing aid 120 fastened to the first climbing aid 110.

The unit can include a webbing 130 of a tubular and an elongated geometry. The webbing 130 can have a proximal end and a distal end. The unit can further include a tube 140, a first link 150, a second link 160, a first webbing slider 170, and a second webbing slider 180. The tube 140 is positioned slidable over the webbing 130 about the middle of the webbing 130. The tube has a proximal end and a distal end. Adjacent to the proximal end of the tube over the webbing is the first link and the second link can be positioned adjacent to the distal end of the tube. The first webbing slider can be positioned adjacent to the proximal end of the webbing and the second webbing slider can be positioned adjacent to the distal end of the webbing.

The proximal end of the webbing can be inserted into the tubing and the tubing can be positioned at the middle of the webbing. The proximal end of the webbing can then be inserted into the first link, the first link can slide over the webbing and position adjacent to the tube. Similarly, the distal end of the webbing can be inserted into the second link and the second link can slide over the webbing and position adjacent to the tube. Each the first link and the second link have two apertures for the webbing to pass through. Alternatively, two webbings can pass through a single aperture in the links, wherein both the links have a single aperture. The links can be in the form of oval rings through which the webbings can pass through.

The further movement of the first link and the second link towards each other can be limited by the tube. Alternatively, the first link and the second link can be clamped to the webbing to prevent the movement of the first link and the second link relative to the webbing.

The proximal end of the webbing can be looped through the first webbing slider and the distal end of the webbing can be looped through the second slider. In one exemplary embodiment, the webbing can be a 1-inch tubular webbing rated at about 4000 pounds. The tubing can be a 6-inch-long piece of ⅜ inches pex tubing. The two links can be ³⁄₁₆-inch grade 30 powder coated. Each link can have an 800-pound working load rating with a 3200-pound minimum breaking strength. The webbing sliders can be aluminum tri-glide with a minimum breaking stretch of 3300 pounds. It is understood that the said specifications for the unit are for an exemplary embodiment, however, the specifications for each component i.e., tube, links, and sliders can be varied without departing from the scope of the present invention.

To mount the first unit 110, the proximal end and the distal end of the webbing can be looped through apertures in the climbing stick 200. The free ends of the webbing after looping through the two apertures are looped through the first webbing slider and the second webbing slider respectively. The height of each unit can be adjusted using the webbing sliders.

To mount a second unit to the first unit, a similar method can be repeated except the proximal end and the distal end of the second unit can be looped through the first link and the second link of the first unit, thus mounting the second unit to the first unit. Similarly, additional units can be added wherein each additional unit can be mounted to the two links of the immediate upper unit.

In one exemplary embodiment, the unit can have two longitudinal straps and a bridging strap. A free end of the longitudinal strap and a free end of the bridging strap can be fastened to the first link. Similarly, a free end of the second longitudinal strap and another end of the bridging strap can be fastened to the second link. The bridging strap can have the tube encasing the bridging strap.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A climbing aid comprising a plurality of units, each unit of the plurality of units comprises:
   a webbing of an elongated geometry, the webbing has a proximal end and a distal end;
   a hollow tube positioned at a middle of the webbing, wherein the webbing slidably passes through the hollow tube, the hollow tube has a proximal end and a distal end;
   a right link positioned adjacent to the proximal end of the hollow tube, the right link has an aperture through which the webbing slidably passes;
   a left link positioned adjacent to the distal end of the hollow tube, the left link has an aperture through which the webbing slidably passes;
   a right webbing slider positioned between the right link and the proximal end of the webbing, wherein the proximal end of the webbing loops through the right webbing slider;
   a left webbing slider positioned between the left link and the distal end of the webbing, wherein the distal end of the webbing loops through the left webbing slider,
   wherein the plurality of units comprises a first unit and a second unit, wherein a proximal end of a webbing of the second unit loops through the right link of the first unit and then loops through a right webbing slider of the second unit, wherein a distal end of the webbing of the second unit loops through the left link of the first unit and then loops through a left webbing slider of the second unit;
   wherein the proximal end of the webbing of the second unit loops through the right webbing slider of the second unit; and
   wherein the distal end of the webbing of the second unit loops through the left webbing slider of the second unit.

2. The climbing aid according to claim 1, wherein the right webbing slider and the left webbing slider are tri-glide sliders.

3. The climbing aid according to claim 1, wherein the left link and the right link are slidably mounted to the webbing.

4. The climbing aid according to claim 1, wherein the hollow tube is stiff and limits movement of the left link and the right link towards each other.

5. The climbing aid according to claim 1, wherein the proximal end of the webbing of the first unit is configured to loop through a first aperture in a climbing stick and then loop through the right webbing slider of the first unit, wherein the distal end of the webbing of the first unit is configured to loop through a second aperture in the climbing stick and then loops through the left webbing slider of the first unit, wherein the first aperture and the second aperture of the climbing stick are spaced apart.

6. The climbing aid according to claim 5, wherein the plurality of units further comprises a third unit, wherein the proximal end of the webbing of the third unit loops through the right link of the second unit and then loops through the right webbing slider of the third unit, wherein the distal end of the webbing of the third unit loops through the left link of the second unit and then loops through the left webbing slider of the third unit.

7. A method for climbing up to an elevated vantage point, the method comprising:
   providing a climbing aid, the climbing aid comprising a plurality of units, each unit of the plurality of units comprises:
      a webbing of an elongated geometry, the webbing has a proximal end and a distal end,
      a hollow tube positioned at a middle of the webbing, wherein the webbing slidably passes through the hollow tube, the hollow tube has a proximal end and a distal end,
      a right link positioned adjacent to the proximal end of the hollow tube, the right link has an aperture through which the webbing slidably passes,
      a left link positioned adjacent to the distal end of the hollow tube, the left link has an aperture through which the webbing slidably passes,
      a right webbing slider positioned between the right link and the proximal end of the webbing, wherein the proximal end of the webbing loops through the right A webbing slider,
      a left webbing slider positioned between the left link and the distal end of the webbing, wherein the distal end of the webbing loops through the left webbing slider;
   wherein the plurality of units comprises a first unit and a second unit, wherein the method further comprises:
      looping a proximal end of a webbing of the second unit through the right link of the first unit and then looping through a right webbing slider of the second unit; and
      looping a distal end of the webbing of the second unit through the left link of the first unit and then looping through a left webbing slider of the second unit;
   wherein the proximal end of the webbing of the second unit loops through the right webbing slider of the second unit; and
   wherein the distal end of the webbing of the second unit loops through the left webbing slider of the second unit.

8. The method according to claim 7, wherein the method further comprises:
   mounting the first unit to a climbing stick, wherein the climbing stick is secured to a tree.

9. The method according to claim 8, wherein the method further comprises a step of:

increasing or decreasing a distance between the hollow tube of the first unit and the hollow tube of the second unit.

10. The method according to claim 7, wherein the method further comprises the step of:

upon fastening the second unit to the first unit, unfastening the second unit from the first unit.

\* \* \* \* \*